United States Patent
Hsu et al.

(10) Patent No.: US 10,579,569 B2
(45) Date of Patent: Mar. 3, 2020

(54) UNIVERSAL SERIAL BUS TYPE-C INTERFACE CIRCUIT AND PIN BYPASS METHOD THEREOF

(71) Applicant: Nuvoton Technology Corporation, Hsinchu (TW)

(72) Inventors: Chao-Chiuan Hsu, Hsinchu (TW); Lian-Cheng Tsai, Hsinchu (TW); Shih-Hsuan Yen, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 16/100,214

(22) Filed: Aug. 10, 2018

(65) Prior Publication Data

US 2019/0213159 A1 Jul. 11, 2019

(30) Foreign Application Priority Data

Jan. 11, 2018 (TW) .............................. 107101121 A

(51) Int. Cl.
| | |
|---|---|
| *G06F 13/40* | (2006.01) |
| *G06F 13/28* | (2006.01) |
| *G06F 13/42* | (2006.01) |
| *G06F 13/38* | (2006.01) |

(52) U.S. Cl.
CPC ........ *G06F 13/4022* (2013.01); *G06F 13/385* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 2007/0278999 A1 | 12/2007 | Hsia | |
| 2016/0342492 A1* | 11/2016 | Chen | ..................... G06F 13/385 |
| 2017/0052578 A1* | 2/2017 | Agarwal | ................. G06F 1/263 |

FOREIGN PATENT DOCUMENTS

| | | |
|---|---|---|
| CN | 105867593 | 8/2016 |
| TW | M526106 | 7/2016 |
| TW | M534844 | 1/2017 |
| TW | 201717045 | 5/2017 |

OTHER PUBLICATIONS

"Office Action of Taiwan Counterpart Application", dated Nov. 15, 2018, p. 1-p. 5.

* cited by examiner

*Primary Examiner* — Idriss N Alrobaye
*Assistant Examiner* — Dayton Lewis-Taylor
(74) *Attorney, Agent, or Firm* — JCIPRNET

(57) ABSTRACT

A universal serial bus type-C interface circuit and a pin bypass method thereof are provided. The interface circuit includes a first configuration channel pin, a second configuration channel pin, a port manager and a port controller. The port manager has a first signal terminal and a second signal terminal. The port controller includes a multiplexer circuit and a control logic circuit. The multiplexer circuit is coupled to the first configuration channel pin, the second configuration channel pin, the first signal terminal and the second signal terminal. The control logic circuit is coupled to the multiplexer circuit and provides a multiplexer control signal to the multiplexer circuit in response to a switching request. The multiplexer circuit couples the first configuration channel pin and the second configuration channel pin to the first signal terminal and the second signal terminal respectively according to the multiplexer control signal.

22 Claims, 4 Drawing Sheets

UNIVERSAL SERIAL BUS TYPE-C INTERFACE CIRCUIT AND PIN BYPASS METHOD THEREOF

CROSS-REFERENCE TO RELATED APPLICATION

This application claims the priority benefit of Taiwan application no. 107101121, filed on Jan. 11, 2018. The entirety of the above-mentioned patent application is hereby incorporated by reference herein and made a part of this specification.

BACKGROUND

Field of the Invention

The invention relates to an interface circuit and more particularly, to a universal serial bus (USB) type-C interface circuit and a pin bypass method thereof.

Description of Related Art

A universal serial bus (USB) type-C interface is a new USB interface launched in recent years. Although the USB type-C interface is defined with a debug accessory mode, an external switch controlled by a plurality of switching signals is still required to be added in for accomplishing signal switching. Accordingly, the detection of the USB type C interface still requires an external circuit for support, which leads to inconvenience of the detection of the USB type C interface.

SUMMARY

The invention provides a universal serial bus (USB) type-C interface circuit and a pin bypass method thereof capable of improving detection convenience.

A USB type-C interface circuit of the invention includes a first configuration channel pin, a second configuration channel pin, a port manager and a port controller. The port manager has a first signal terminal and a second signal terminal. The port controller includes a multiplexer circuit and a control logic circuit. The multiplexer circuit is coupled to the first configuration channel pin, the second configuration channel pin, the first signal terminal and the second signal terminal. The control logic circuit is coupled to the multiplexer circuit and provides a multiplexer control signal to the multiplexer circuit in response to a switching request. The multiplexer circuit couples the first configuration channel pin and the second configuration channel pin to the first signal terminal and the second signal terminal respectively according to the multiplexer control signal.

A pin bypass method of a USB type-C interface circuit of the invention includes the following steps. Whether a control logic circuit receive a switching request is determined. When the control logic circuit receives the switching request, the first configuration channel pin and the second configuration channel pin are coupled to the first signal terminal and the second signal terminal of the port manager respectively in response to the switching request. When the control logic circuit does not receive the switching request, the first configuration channel pin and the second configuration channel pin are disconnected from the first signal terminal and the second signal terminal.

To sum up, in the USB type-C interface circuit and the pin bypass method thereof provided by the embodiments of the invention, the multiplexer circuit can couple the first configuration channel pin and the second configuration channel pin to the first signal terminal and the second signal terminal respectively in response to the switching request. In this way, an external detecting device can be directly connected to and communicate with the port manager, without any additional switching circuit, to obtain parameters required for detecting the USB type-C interface circuit, which can improve the convenience of the detection.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
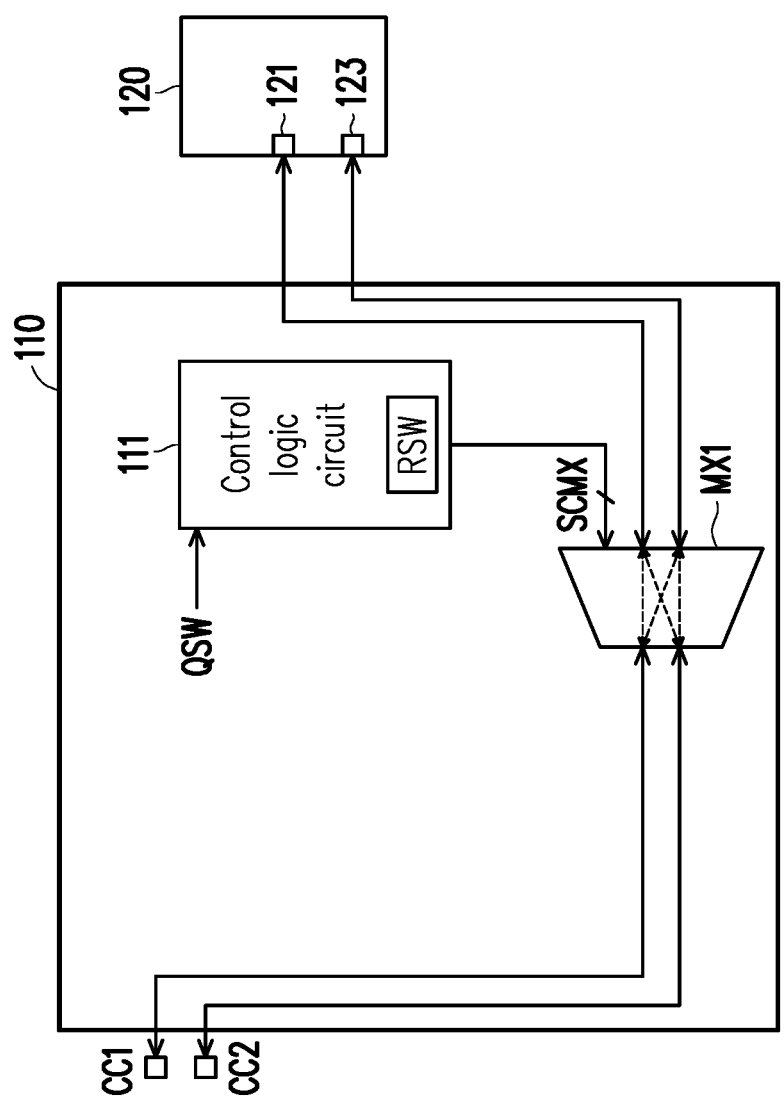
FIG. 1 is a schematic system diagram illustrating a universal serial bus (USB) type-C interface circuit according to an embodiment of the invention.

FIG. 1 is a schematic system diagram illustrating a universal serial bus (USB) type-C interface circuit according to an embodiment of the invention. Referring to FIG. 1, in the present embodiment, a USB type-C interface circuit 100 includes a first configuration channel pin CC1, a second configuration channel pin CC2, a port manager 110 and a port controller 120. The port manager 120 has a first signal terminal 121 and a second signal terminal 123.

The port controller 110 includes a multiplexer circuit MX1 and a control logic circuit 111. The multiplexer circuit MX1 couples to the first configuration channel pin CC1, the second configuration channel pin CC2, the first signal terminal 121 and the second signal terminal 123 of the port manager 120. The control logic circuit 111 is coupled to the multiplexer circuit MX1 and receives a switching request QSW to provide a multiplexer control signal SCMX to the multiplexer circuit MX1 in response to the switching request QSW. In addition, the control logic circuit 111 is configured with a switching register RSW, and the control logic circuit 111 configures the switching register RSW according to the switching request QSW to set the multiplexer control signal SCMX according to a state of the switching register RSW.

The multiplexer circuit MX1 couples the first configuration channel pin CC1 and the second configuration channel pin CC2 to the first signal terminal 121 and the second signal terminal 123 respectively according to the multiplexer control signal SCMX. In other words, the multiplexer circuit MX1, according to the multiplexer control signal SCMX, couples the first configuration channel pin CC1 to one of the first signal terminal 121 and the second signal terminal 123 and couples the second configuration channel pin CC2 to the other one of the first signal terminal 121 and the second signal terminal 123. Therein, the multiplexer control signal SCMX may be a multi-bit signal for determining whether to turn on the multiplexer circuit MX1 and whether to cross-couple an input terminal and an output terminal.

According to the description above, when the multiplexer circuit MX1 couples the first configuration channel pin CC1 and the second configuration channel pin CC2 to the first signal terminal 121 and the second signal terminal 123 respectively in response to the switching request QSW, an external detecting device coupled to the first configuration channel pin CC1 and the second configuration channel pin CC2 may be directly coupled to the port manager 120, so as to directly communicate with the port manager 120. Thereby, the external detecting device may be directly connected to and communicate with the port manager 120, without any additional switching circuit, to obtain parameters required for detecting the USB type-C interface circuit 100, which may improve the convenience of the detection.

Figure 2:
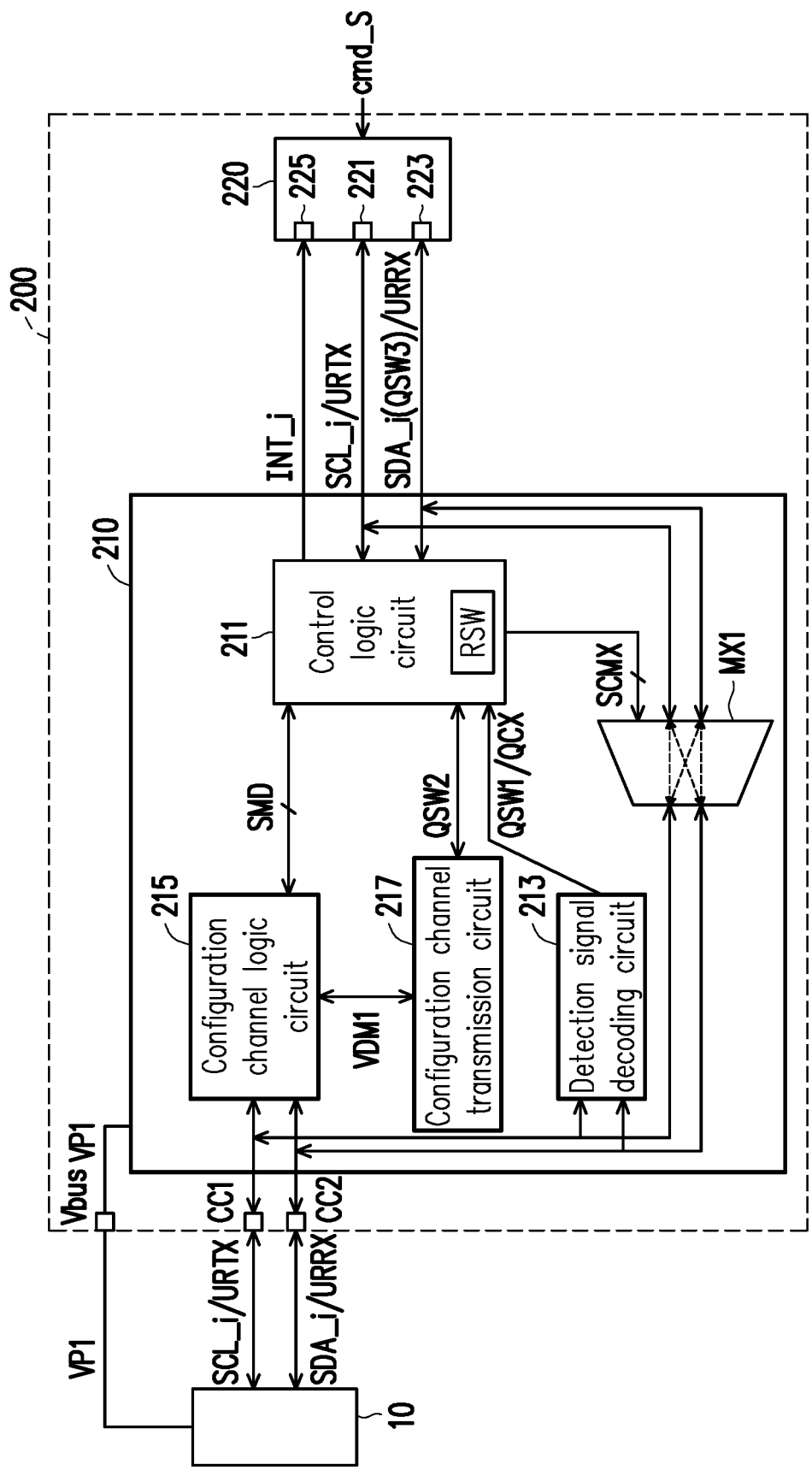
FIG. 2 is a schematic system diagram illustrating a USB type-C interface circuit according to another embodiment of the invention.

FIG. 2 is a schematic system diagram illustrating a USB type-C interface circuit according to an embodiment of the invention. Referring to FIG. 1 and FIG. 2, a USB type-C interface circuit 200 includes a first configuration channel pin CC1, a second configuration channel pin CC2, a power pin Vbus, a port manager 210 and a port controller 220, wherein the same or similar reference numbers are used to refer to the same or like parts.

The port manager 220 has a first signal terminal 221, a second signal terminal 223 and an interrupt signal terminal 225, wherein the first signal terminal 221 and the second signal terminal 223 are configured to transmit an inter-integrated circuit (I2C) signal and a universal asynchronous receiver/transmitter (UART) signal.

The port controller 110 includes a multiplexer circuit MX1, a control logic circuit 211, a detection signal decoding circuit 213, a configuration channel logic circuit 215 and a configuration channel transmission circuit 217. The control logic circuit 211 is coupled to the first signal terminal 221, the second signal terminal 223 and the interrupt signal terminal 225 of the port manager 220, wherein the interrupt signal terminal 225 is configured to receive an interrupt signal INT_i which is provided by the control logic circuit 211 and related to an I2C signal.

The detection signal decoding circuit 213 is coupled to the first configuration channel pin CC1, the second configuration channel pin CC2 and the control logic circuit 211. The configuration channel logic circuit 215 is coupled to the first configuration channel pin CC1, the second configuration channel pin CC2 and the control logic circuit 211. The configuration channel transmission circuit 217 is coupled to configuration channel logic circuit 215 and the control logic circuit 211, so as to be coupled to the first configuration channel pin CC1 and the second configuration channel pin CC2 through the configuration channel logic circuit 215.

The first configuration channel pin CC1 and the second configuration channel pin CC2 are configured to be coupled to an external USB type-C interface circuit 10 of an external electronic device (not shown). When the external electronic device (not shown) is a general purpose USB device, one of the first configuration channel pin CC1 and the second configuration channel pin CC2 receives a specific voltage level or a bi-phase mark coding (BMC) signal. When the external electronic device (not shown) is a detecting device, the first configuration channel pin CC1 and the second configuration channel pin CC2 receives a detection signal, wherein a type of the detection signal includes an I2C signal and a UART signal.

According to the description above, when the external electronic device (not shown) is coupled to the first configuration channel pin CC1 and the second configuration channel pin CC2, the detection signal decoding circuit 213 decodes the signal received by the first configuration channel pin CC1 and the second configuration channel pin CC2 and determines a type of the signal, so as to determine whether the signal received by the first configuration channel pin CC1 and the second configuration channel pin CC2 meets the aforementioned type of the detection signal, i.e., whether the external electronic device (not shown) is a detecting device. In addition, the detection signal decoding circuit 213, when determining that the signal received by the first configuration channel pin CC1 and the second configuration channel pin CC2 is either the I2C signal or the UART signal through at least one a signal protocol or a voltage difference, determines that the external electronic device (not shown) is the detecting device. Otherwise, the detection signal decoding circuit 213, when determining that the signal received by the first configuration channel pin CC1 and the second configuration channel pin CC2 is neither the I2C signal nor the UART signal through the at least one of the signal protocol or the voltage difference, determines that the external electronic device (not shown) is the USB device.

When the signal received by the first configuration channel pin CC1 and the second configuration channel pin CC2 meets the type of the detection signal, i.e., the external electronic device (not shown) is the detecting device, the detection signal decoding circuit 213 provides a switching request QSW1 to the control logic circuit 211 to set the switching register RSW, so as to control a coupling state of the multiplexer circuit MX1. In addition, it is assumed that the multiplexer circuit MX1 couples the first configuration channel pin CC1 to the first signal terminal 221 and couples the second configuration channel pin CC2 to the second signal terminal 223 by default. Then, when the detection signal decoding circuit 213 detects that the first configuration channel pin CC1 receives a clock signal SCL_i of the I2C signal or is used for providing a transmission signal URTX of the UART signal, the multiplexer circuit MX1 is enabled by the switching request QSW1, but the default coupling state of the multiplexer circuit MX1 is not changed. When the detection signal decoding circuit 213 detects that the first configuration channel pin CC1 receives a data signal SDA_i of the I2C signal or is used for receiving a receiving signal URRX of the UART signal, the multiplexer circuit MX1 is enabled by the switching request QSW1, but the coupling state of the multiplexer circuit MX1 is interleaved (or inverted).

The configuration channel logic circuit 215 detects an operation mode (e.g., a source mode or a sink mode) of the external USB type-C interface circuit 10 according to voltage levels or signals of the first configuration channel pin CC1 and the second configuration channel pin CC2 and correspondingly provides a mode signal SMD to the control logic circuit 111. The configuration channel transmission circuit 217 receives the signal received by the first configuration channel pin CC1 and the second configuration channel pin CC2 through the configuration channel logic circuit 215 and decodes the signal received by the first configuration channel pin CC1 and the second configuration channel pin CC2.

According to the description above, when the external USB type-C interface circuit 10 transmits the BMC signal, the configuration channel transmission circuit 217 decodes the BMC signal. When the BMC signal records a vendor-defined message VDM1 corresponding to a switching request QSW2, the configuration channel transmission circuit 217 provides the switching request QSW2 to the control logic circuit 211 in response to the vendor-defined message VDM1 to set the switching register RSW, thereby controlling whether to enable the multiplexer circuit MX1. After the multiplexer circuit MX1 is enabled, the coupling state of the multiplexer circuit MX1 is still controlled by a detection result of the detection signal decoding circuit 213.

The control logic circuit 211 communicates with the port manager 120 by the I2C signal through the first signal terminal 221, the second signal terminal 223 and the interrupt signal terminal 225. When the port manager 220 has a demand, the port manager 220 may transmit a switching request QSW3 to the control logic circuit 211 through the data signal SDA_i and the clock signal SCL_i of the I2C signal to set the switching register RSW, thereby controlling whether to enable the multiplexer circuit MX1. After the multiplexer circuit MX1 is enabled, the coupling state of the multiplexer circuit MX1 is still controlled by a detection result of the detection signal decoding circuit 213. In the embodiments of the invention, the port manager 220 may receive a system command cmd_S to provide the switching request QSW3 in response to the system command cmd_S. The system command cmd_S may be provided by an external control circuit, e.g., a chipset in a mainboard or a micro-controller in an electronic device.

The power pin Vbus is coupled between the port controller 210 and the external USB type-C interface circuit 10 and configured to transmit a power supply voltage VP1. In other words, when the external USB type-C interface circuit 10 is in the sink mode, the port controller 210 may transmit the power supply voltage VP1 to the external USB type-C interface circuit 10 through the power pin Vbus, wherein the power supply voltage Vp1 is provided by a power-supply circuit (not shown). When the external USB type-C interface circuit 10 is in the source mode, the port controller 210 may receive the power supply voltage VP1 provided by the external USB type-C interface circuit 10 through the power pin Vbus.

When the first configuration channel pin CC1 and the second configuration channel pin CC2 are coupled to the first signal terminal 221 and the second signal terminal 223 respectively, the port manager 220 may communicate with a detecting device (not shown). When the port manager 220 communicates with the detecting device (not shown) by the I2C signal, the control logic circuit 211 may determine whether to receive the I2C signal according to a target address. When the port manager 220 communicates with the detecting device (not shown) by the UART signal, the control logic circuit 211 may directly ignore the UART signal due to being incapable of decoding the UART signal. Thus, the port manager 220 and the detecting device (not shown), when communicating with each other, do not influence the control logic circuit 211.

When the multiplexer circuit MX1 couples the first configuration channel pin CC1 and the second configuration channel pin CC2 to the first signal terminal 221 and the second signal terminal 223 respectively, the port controller 210 detects a coupling state of the external USB type-C interface circuit 10 with the first configuration channel pin CC1 and the second configuration channel pin CC2, thereby, determining whether to disconnect the first configuration channel pin CC1 and the second configuration channel pin CC2 from the first signal terminal 221 and the second signal terminal 223.

In an embodiment of the invention, when the multiplexer circuit MX1 couples the first configuration channel pin CC1 and the second configuration channel pin CC2 to the first signal terminal 221 and the second signal terminal 223 respectively, and the external USB type-C interface circuit 10 is operated as a source device, the control logic circuit 221 detects the power pin Vbus to determine whether the power pin Vbus receives the power supply voltage VP1 provided by the external USB type-C interface circuit 10.

When the power pin Vbus receives the power supply voltage VP1, it represents that the external USB type-C interface circuit 10 keeps being connected with the first configuration channel pin CC1 and the second configuration channel pin CC2. Thus, the control logic circuit 211 keeps the first configuration channel pin CC1 and the second configuration channel pin CC2 being connected with the first signal terminal 221 and the second signal terminal 223. When the power pin Vbus does not receive the power supply voltage VP1, it represents that the external USB type-C interface circuit 10 is disconnected from the first configuration channel pin CC1 and the second configuration channel pin CC2. Thus, the control logic circuit 211 controls the multiplexer circuit MX1, through the multiplexer control signal SCMX, to disconnect the first configuration channel pin CC1 and the second configuration channel pin CC2 from the first signal terminal 221 and the second signal terminal 223.

In an embodiment of the invention, when the multiplexer circuit MX1 couples the first configuration channel pin CC1 and the second configuration channel pin CC2 to the first signal terminal 221 and the second signal terminal 223 respectively, the detection signal decoding circuit 213 may count an idle time in which the first configuration channel pin CC1 and the second configuration channel pin CC2 do not receive any signal, wherein the detection signal decoding circuit 213 may include a timer for counting the idle time.

When the idle time does not reach a threshold time, it represents that the external USB type-C interface circuit 10 may still keep being connected with the first configuration channel pin CC1 and the second configuration channel pin CC2. Thus, the detection signal decoding circuit 213 does not send any notification to the control logic circuit 211, such that control logic circuit 211 still keeps the first configuration channel pin CC1 and the second configuration channel pin CC2 being connected with the first signal terminal 221 and the second signal terminal 223.

When the idle time reaches the threshold time, it represents that the external USB type-C interface circuit 10 may already be disconnected from the first configuration channel pin CC1 and the second configuration channel pin CC2. Thus, the detection signal decoding circuit 213 provides a disconnection request QCX to the control logic circuit 211. Then, the control logic circuit 211 resets the switching register RSW according to the disconnection request QCX to control the multiplexer circuit MX1 to disconnect the first configuration channel pin CC1 and the second configuration channel pin CC2 from the first signal terminal 221 and the second signal terminal 223.

In an embodiment of the invention, when the multiplexer circuit MX1 couples the first configuration channel pin CC1 and the second configuration channel pin CC2 to the first signal terminal 221 and the second signal terminal 223 respectively, the detection signal decoding circuit 213 may detect a signal bias of the signal received by the first configuration channel pin CC1 and the second configuration channel pin CC2, wherein the detection signal decoding circuit 213 includes a potential detector to detect the signal bias.

When the signal bias is greater than a bias threshold, it represents that the port manager 220 still communicates with the detecting device (not shown) by the detection signal, and the detection signal decoding circuit 213 does not send any notification to the control logic circuit 211, such that control logic circuit 211 still keeps the first configuration channel pin CC1 and the second configuration channel pin CC2 being connected with the first signal terminal 221 and the second signal terminal 223. When the signal bias keeps being lower than the bias threshold for a time which does not reach a predetermined time period, the port manager 220 may be incompletely disconnected from the detecting device (not shown), and for the sake of safety, the detection signal decoding circuit 213 still does not send any notification to the control logic circuit 211, thereby preventing the communication between the port manager 220 and the detecting device (not shown) from being inferred. When the signal bias is lower than the bias threshold over the predetermined time period, it represents that the external USB type-C interface circuit 10 does not transmits the detection signal, i.e., the external electronic device (not shown) does not have to be connected with the port manager 220. Thus, the detection signal decoding circuit 213 provides the disconnection request QCX to the control logic circuit 211. Then, the control logic circuit 211 resets the switching register RSW according to the disconnection request QCX to control the multiplexer circuit MX1 to disconnect the first configuration channel pin CC1 and the second configuration channel pin CC2 from the first signal terminal 221 and the second signal terminal 223.

Figure 3:
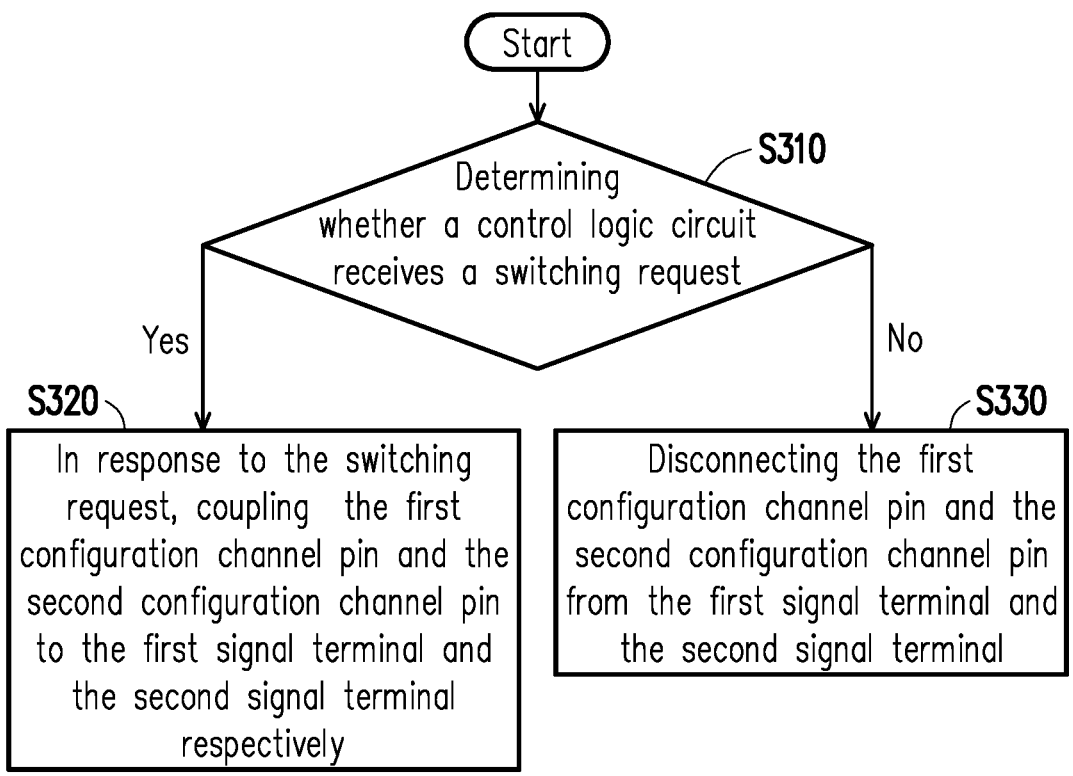
FIG. 3 is a flowchart illustrating a pin bypass method of a USB type-C interface circuit according to an embodiment of the invention.

FIG. 3 is a flowchart illustrating a pin bypass method of a USB type-C interface circuit according to an embodiment of the invention. Referring to FIG. 3, in the present embodiment, a pin bypass method of a USB type-C interface circuit of the invention includes the following steps. In step S310, whether a control logic circuit receives a switching request is determined. When the control logic circuit receives the switching request, i.e., the determination result of step S310 is "Yes", step S320 is performed. When the control logic circuit does not receive the switching request, i.e., the determination result of step 310 is "No", step S330 is performed.

In step S320, the first configuration channel pin and the second configuration channel pin are coupled to the first signal terminal and the second signal terminal respectively in response to the switching request. In step S330, the first configuration channel pin and the second configuration channel pin are disconnected from the first signal terminal and the second signal terminal.

Figure 4:
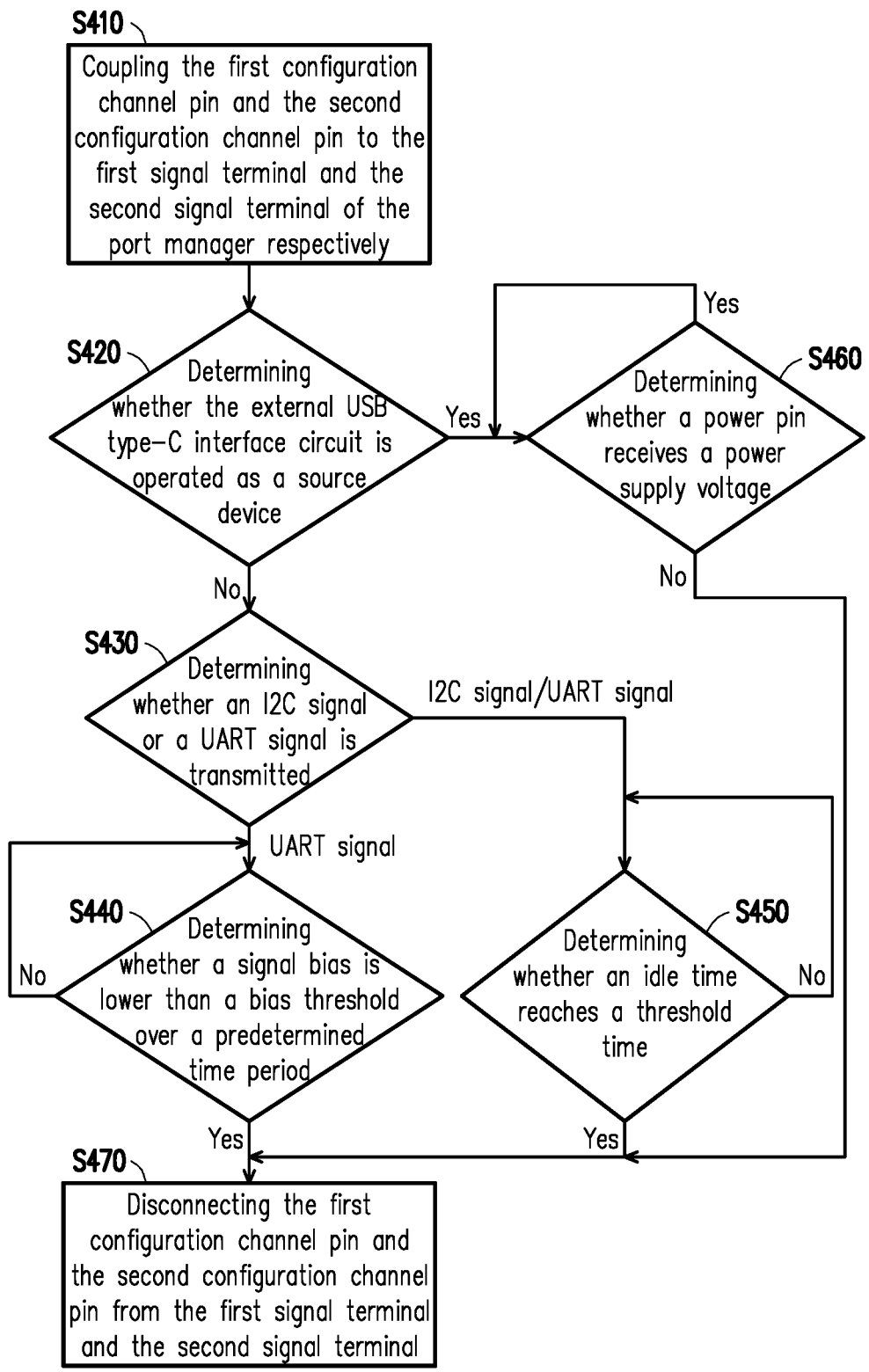
FIG. 4 is a flowchart illustrating the pin bypass method of the USB type-C interface circuit according to another embodiment of the invention.

FIG. 4 is a flowchart illustrating the pin bypass method of the USB type-C interface circuit according to another embodiment of the invention. Referring to FIG. 3 and FIG. 4, in the present embodiment, the pin bypass method of the USB type-C interface circuit of the invention further includes the following steps, wherein step S410 follows step S320 which is illustrated in FIG. 3. In step S410, the first configuration channel pin and the second configuration channel pin are coupled to the first signal terminal and the second signal terminal of the port manager respectively. In step S420, whether the external USB type-C interface circuit is operated as a source device is determined. When the external USB type-C interface circuit is operated as the source device, i.e., the determination result of step S420 is "Yes", step S460 is performed. When the external USB type-C interface circuit 10 is operated as a sink device, i.e., the determination result of step S420 is "No", step S430 is performed.

In step S430, whether the external USB type-C interface circuit transmits either an I2C signal or a UART signal is determined. When the external USB type-C interface circuit transmits the UART signal, steps S440 and 450 are performed simultaneously. When the external USB type-C interface circuit transmits the I2C signal, only step S450 is performed.

In step S440, whether a signal bias of a signal received by the first configuration channel pin and the second configuration channel pin is lower than a bias threshold is determined. When the signal bias is greater than or equal to the bias threshold, or the signal bias is lower than the bias threshold for a time period which does not reach a predetermined time period, i.e., the determination result of step S440 is "No", step S440 is returned to. When the signal bias is lower than the bias threshold over the predetermined time period, i.e., the determination result of step S440 is "Yes", step S470 is performed.

In step S450, whether an idle time in which the first configuration channel pin and the second configuration channel pin do not receive any signal reaches a threshold time is determined. When the idle time does not reach the threshold time, i.e., the determination result of step S450 is "No", step S450 is returned to. When the idle time reaches the threshold time, i.e., the determination result of step S450 is "Yes", step S470 is performed.

In step S460, whether a power pin receives a power supply voltage provided by the external USB type-C interface circuit is determined. When the power pin receives the power supply voltage, i.e., the determination result of step S460 is "Yes", step S460 is returned to. When the power pin does not receive the power supply voltage, i.e., the determination result of step S460 is "No", step S470 is performed.

In step S470, the first configuration channel pin and the second configuration channel pin are disconnected from the first signal terminal and the second signal terminal. The sequence of steps S310, S320, S330, S410, S420, S430, S440, S450, S460 and S470 are merely for the purpose of illustration which is limited in the invention, and In the meantime, details of steps S310, S320, S330, S410, S420, S430, S440, S450, S460 and S470 may refer to the description with respect to the embodiments illustrated in FIG. 1 and FIG. 2 and will not repeated hereinafter.

In light of the foregoing, in the USB type-C interface circuit and the pin bypass method thereof provided by the embodiments of the invention, the multiplexer circuit can couple the first configuration channel pin and the second configuration channel pin to the first signal terminal and the second signal terminal respectively in response to the switching request. In this way, the external detecting device can be directly connected to and communicate with the port manager, without any additional switching circuit, to obtain parameters required for detecting the USB type-C interface circuit, which can improve the convenience of the detection.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A universal serial bus (USB) type-C interface circuit, comprising:
    a first configuration channel pin;
    a second configuration channel pin;
    a port manager, having a first signal terminal and a second signal terminal; and
    a port controller; comprising:
        a multiplexer circuit, coupled between the first configuration channel pin, the second configuration channel pin, the first signal terminal and the second signal terminal; and
        a control logic circuit, coupled to the multiplexer circuit and providing a multiplexer control signal to the multiplexer circuit in response to a switching request, wherein when the control logic circuit receives the switching request, the multiplexer circuit couples the first configuration channel pin and the second configuration channel pin to the first signal terminal and the second signal terminal respectively according to the multiplexer control signal in response to the switching request, and
    when the control logic circuit does not receive the switching request, the multiplexer circuit disconnects the first configuration channel pin and the second configuration channel pin from the first signal terminal and the second signal terminal.

2. The USB type-C interface circuit according to claim 1, wherein the port controller further comprises:
    a configuration channel logic circuit, coupled to the first configuration channel pin, the second configuration channel pin and the control logic circuit to determine an operation mode of an external USB type-C interface circuit coupled to the first configuration channel pin and the second configuration channel pin according to voltage levels or signals of the first configuration channel pin and the second configuration channel pin and correspondingly provide a mode signal to the control logic circuit; and
    a configuration channel transmission circuit, coupled to the configuration channel logic circuit and the control logic circuit to receive a signal received by the first configuration channel pin and the second configuration channel pin through the configuration channel logic circuit and decode the signal received by the first configuration channel pin and the second configuration channel pin, wherein when the first configuration channel pin and the second configuration channel pin receive a vendor-defined message corresponding to the switching request, the configuration channel transmission circuit provides the switching request to the control logic circuit.

3. The USB type-C interface circuit according to claim 2, wherein when the multiplexer circuit couples the first configuration channel pin and the second configuration channel pin to the first signal terminal and the second signal terminal respectively, and the external USB type-C interface circuit is operated as a source device, the control logic circuit detects a power pin to determine whether the power pin receives a power supply voltage provided by the external USB type-C interface circuit, and when the power pin does not receive the power supply voltage, the control logic circuit controls, through the multiplexer control signal, the multiplexer circuit to disconnect the first configuration channel pin and the second configuration channel pin from the first signal terminal and the second signal terminal.

4. The USB type-C interface circuit according to claim 1, wherein the control logic circuit is coupled to the first signal terminal and the second signal terminal, and the port manager transmits the switching request through the first signal terminal and the second signal terminal.

5. The USB type-C interface circuit according to claim 4, wherein the port manager receives a system command to provide the switching request in response to the system command.

6. The USB type-C interface circuit according to claim 1, wherein the port controller further comprises a detection signal decoding circuit coupled to the first configuration channel pin, the second configuration channel pin and the control logic circuit, and configured to decode a signal received by the first configuration channel pin and the second configuration channel pin, determine a type of the signal and provide the switching request to the control logic circuit when the signal received by the first configuration channel pin and the second configuration channel pin meets a type of a detection signal.

7. The USB type-C interface circuit according to claim 6, wherein the type of the detection signal comprises an inter-integrated circuit (I2C) signal and a universal asynchronous receiver/transmitter (UART) signal.

8. The USB type-C interface circuit according to claim 6, wherein when the multiplexer circuit couples the first configuration channel pin and the second configuration channel pin to the first signal terminal and the second signal terminal respectively, the detection signal decoding circuit counts an idle time in which the first configuration channel pin and the second configuration channel pin do not receive any signal, and when the idle time reaches a threshold time, the detection signal decoding circuit provides a disconnection request to the control logic circuit to control the multiplexer circuit to disconnect the first configuration channel pin and the second configuration channel pin from the first signal terminal and the second signal terminal.

9. The USB type-C interface circuit according to claim 8, wherein the detection signal decoding circuit comprises a timer to count the idle time.

10. The USB type-C interface circuit according to claim 6, wherein when the multiplexer circuit couples the first configuration channel pin and the second configuration channel pin to the first signal terminal and the second signal terminal respectively, the detection signal decoding circuit detects a signal bias of the signal received by the first configuration channel pin and the second configuration channel pin, and when the signal bias is lower than a bias threshold, the detection signal decoding circuit provides a disconnection request to the control logic circuit to control the multiplexer circuit to disconnect the first configuration channel pin and the second configuration channel pin from the first signal terminal and the second signal terminal.

11. The USB type-C interface circuit according to claim 10, wherein the detection signal decoding circuit comprises a potential detector to detect the signal bias.

12. The USB type-C interface circuit according to claim 1, wherein the control logic circuit is disposed with a switching register, and the control logic circuit configures the switching register according to the switching request and sets the multiplexer control signal according to a state of the switching register.

13. The USB type-C interface circuit according to claim 1, wherein the first configuration channel pin and the second configuration channel pin are respectively coupled to the first signal terminal and the second signal terminal through the multiplexer circuit.

14. A pin bypass method of a USB type-C interface circuit, comprising:
- determining whether a control logic circuit receive a switching request;
- when the control logic circuit receives the switching request, coupling a first configuration channel pin and a second configuration channel pin to a first signal terminal and a second signal terminal respectively in response to the switching request; and
- when the control logic circuit does not receive the switching request, disconnecting the first configuration channel pin and the second configuration channel pin from the first signal terminal and the second signal terminal.

15. The pin bypass method according to claim 14, wherein the switching request responds to a vendor-defined message received by the first configuration channel pin and the second configuration channel pin.

16. The pin bypass method according to claim 15, wherein the first configuration channel pin and the second configuration channel pin are coupled to an external USB type-C interface circuit, and the pin bypass method further comprises:
- when the first configuration channel pin and the second configuration channel pin are coupled to the first signal terminal and the second signal terminal respectively, and the external USB type-C interface circuit is operated as a source device, detecting whether a power pin receives a power supply voltage provided by the external USB type-C interface circuit;
- when the power pin receives the power supply voltage, keeping connecting the first configuration channel pin and the second configuration channel pin to the first signal terminal and the second signal terminal; and
- when the power pin does not receive the power supply voltage, disconnecting the first configuration channel pin and the second configuration channel pin from the first signal terminal and the second signal terminal.

17. The pin bypass method according to claim 14, wherein the switching request is transmitted through the first signal terminal and the second signal terminal.

18. The pin bypass method according to claim 17, wherein the switching request responds to a system command.

19. The pin bypass method according to claim 14, wherein the switching request responds to a detection signal received by the first configuration channel pin and the second configuration channel pin.

20. The pin bypass method according to claim 19, wherein a type of the detection signal comprises an I2C signal and a UART signal.

21. The pin bypass method according to claim 19, further comprising:
- when the first configuration channel pin and the second configuration channel pin are coupled to the first signal terminal and the second signal tennrminal respectively, counting an idle time in which the first configuration channel pin and the second configuration channel pin do not receive any signal;
- when the idle time does not reach a threshold time, keeping connecting the first configuration channel pin and the second configuration channel pin to the first signal terminal and the second signal terminal; and
- when the idle time reaches the threshold time, disconnecting the first configuration channel pin and the second configuration channel pin from the first signal terminal and the second signal terminal.

22. The pin bypass method according to claim 19, further comprising:
- when the first configuration channel pin and the second configuration channel pin are coupled to the first signal terminal and the second signal terminal respectively, detecting a signal bias of a signal received by the first configuration channel pin and the second configuration channel pin;
- when the signal bias is greater than or equal to a bias threshold, or the signal bias is lower than the bias threshold for a time period which does not reach a predetermined time period, keeping connecting the first configuration channel pin and the second configuration channel pin to the first signal terminal and the second signal terminal; and when the signal bias is lower than the bias threshold over the predetermined time period, disconnecting the first configuration channel pin and the second configuration channel pin from the first signal terminal and the second signal terminal.

* * * * *